No. 897,481. PATENTED SEPT. 1, 1908.
W. C. PEASE.
CHURN.
APPLICATION FILED NOV. 12, 1907.
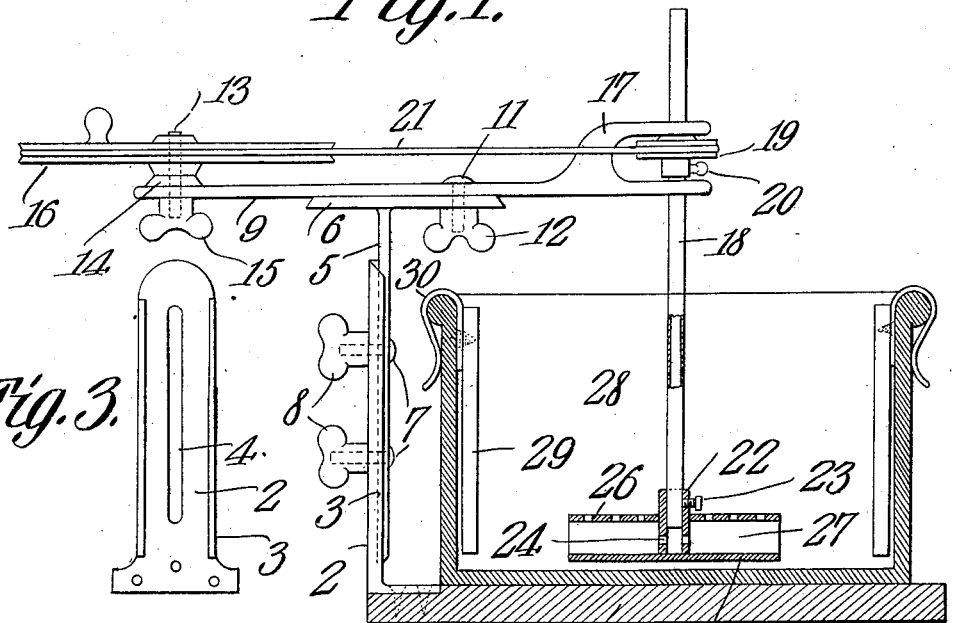
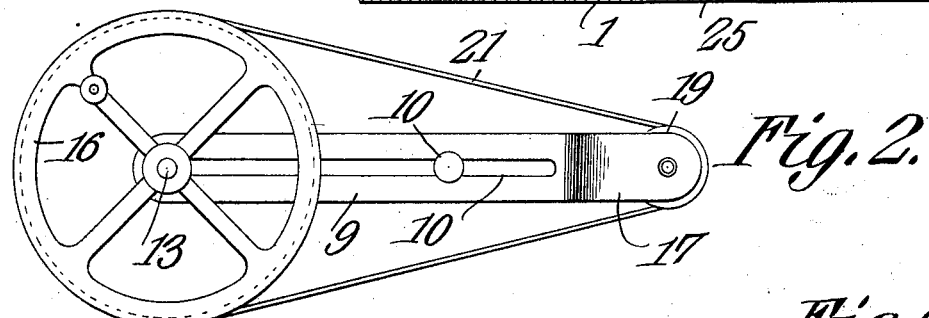
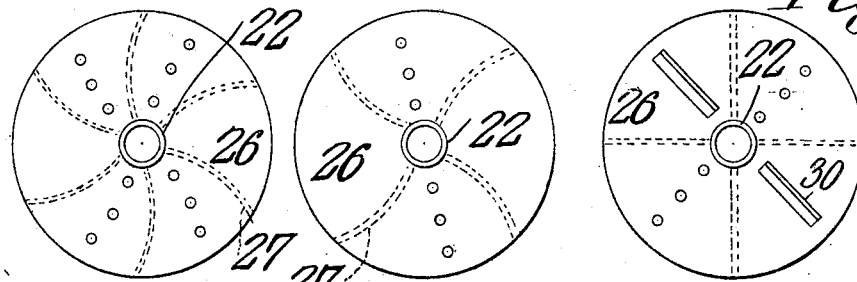
Inventor
William C. Pease.
Witnesses
By C. A. Snow & Co.
Attorneys

UNITED STATES PATENT OFFICE.

WILLIAM C. PEASE, OF MARIETTA, OHIO, ASSIGNOR OF ONE-HALF TO LLOYD V. ROOD, OF MARIETTA, OHIO.

CHURN.

No. 897,481.                Specification of Letters Patent.        Patented Sept. 1, 1908.

Application filed November 12, 1907. Serial No. 401,885.

*To all whom it may concern:*

Be it known that I, WILLIAM C. PEASE, a citizen of the United States, residing at Marietta, in the county of Washington and State of Ohio, have invented a new and useful Churn, of which the following is a specification.

This invention has relation to churns and it consists in the novel construction and arrangement of its parts as hereinafter shown and described.

The object of the invention is to provide a churn mechanism of simple and durable construction which may be easily and readily adjusted to position its parts properly with relation to a vessel used in combination with the said mechanism for holding the cream.

The churn is of that type which possesses a rotating dasher attached to a hollow shaft and which is adapted to draw air through the said shaft as it rotates and liberate the same into the cream below the surface thereof for the purpose of agitating the same and absorbing the latent heat therefrom. The said dasher is of special construction as will hereinafter appear and may be so adjusted as to operate in the cream at any desired distance from the bottom of the vessel containing the same.

Figure 1 is a side elevation of the churn with parts in section. Fig. 2 is a top plan view of the upper portion of the churn. Fig. 3 is a side elevation of a standard used upon the churn, and Figs. 4, 5 and 6 are plan views of modified forms of the dasher used inehet churn.

The mechanism of the churn comprises a base 1 at one edge of which is located a vertically disposed standard 2 having the side flanges 3 and an intermediate elongated opening 4. The shank 5 of the bracket 6 lies between the flanges 3 and the clamp bolts 7 pass transversely through the said shank and the opening 4 of the standard 2. The bolts 7 are provided with wing nuts 8 which are adapted to bear against the outer portion of the standard 2. The upper portion of the bracket 6 is horizontally disposed or lies in a plane parallel with that occupied by the base 1. The arm 9 rests upon the top of the bracket 6 and is provided with an elongated slot 10. The clamp bolt 11 passes transversely through the upper portion of the bracket 6 and lies within the slot 10. The bolt 11 is provided with a wing nut 12 which is adapted to bear against the under side of the bracket 6. The pin 13 passes through the slot 10 and is provided with a collar 14 which rests upon the upper surface of the arm 9. The wing nut 15 is screw threaded upon the lower end of the pin 13 and is adapted to engage the lower side of the arm 9. The band wheel 16 is journaled upon the pin 13. The end of the arm 9 opposite to that portion thereof which is provided with a slot 10 is provided with the bifurcated portion 17 which is vertically disposed. The shaft 18 is journaled in bearings provided in the bifurcated end 17 of the arm 9 and the band wheel 19 is located upon the shaft 18 and is fixed with relation thereto by means of a set screw 20. The said band wheel 19 is located in the bifurcation of the end 17 of the arm 9. The band 21 passes around the wheels 16 and 19. The shaft 18 is hollow and as may be seen is adjustable within the band wheel 19. The said shaft 18 is adapted to carry different forms of dashers at its lower end. The said dashers are provided with the hubs 22 which are adapted to receive the lower end of the shaft 18 and which are held in fixed relation thereto by means of the set screws 23. The said hubs are provided with the lateral perforations 24. The bottom of the dasher is formed by an imperforated plate 25 which closes the lower end of the hub 22. The perforated plate 26 is attached to the upper end of the hub 22 and is held in parallel relation with the plate 25 by means of the blade 27. The said blades 27 may extend radially as shown in Fig. 6 or they may be curved along their longitudinal axes as shown in Figs. 4 and 5. The receptacle 28 rests upon the base 1 and the breakers 29 are vertically disposed along the inner side thereof. Said breakers are provided at their upper ends with the spring clips 30 which engage the upper edge of the said receptacle and hold the same in position.

From the foregoing description it is obvious that an adjustable churn mechanism is provided the parts of which may be easily and quickly adjusted to be properly positioned with relation to cream containing receptacles or vessels of different sizes and that the dasher carried at the lower end of the shaft 18 may be adjusted vertically as conditions may require with relation to the bottom of the said vessel. This may be done by either shifting the shank 5 of the bracket 6 longitudinally with relation to the standard 2 or by shifting the shaft 18 in the band wheel 19. As the band wheel 19 is located in the bifurcation of the end 17 of the arm 9 it is held against vertical movement. It will also be seen that by shifting the pin 13 along the arm 9 that the band 21 may be maintained at proper tension upon the wheels 16 and 19 and by shifting the arm 9 upon the bracket 6 that the shaft 18 and its attached dasher may be properly centered with relation to the vessel 28.

When the parts have been properly adjusted as above indicated the wheel 16 is rotated and through the band 21 and wheel 19 the shaft 18 is rotated. The said shaft carries around it the attached dasher and as the blades 27 rotate about an axis they centrifugally cast the cream away from their outer ends which creates a vacuum between the plates 25 and 26 which vacuum is filled by air which descends through the shaft 18 into the hub 22 and out through the lateral perforations 24 thereof into the space between the said plates. The greater portion of the air thus introduced between the plates is cast off at the ends thereof by centrifugal force as above described into the cream, some of it however passes up through the perforations in the plate 26 into the body of the cream located near the center of the receptacle 28. Thus air is admitted into the cream practically at points located along the entire transverse dimension of the same which aerates the entire body of cream simultaneously and with uniformity and maintains the same in a state of agitation and absorbs the latent heat therefrom. The blades 27 set up a series of orbitally moving currents in the cream which currents are prevented from revolving around the vessel 28 by the breakers 29.

In the form of the dasher as shown in Fig. 6 the plate 26 is provided with the radially disposed wings 30 which are advantageous to use in cream under certain conditions.

Having described my invention what I claim as new and desire to secure by Letters-Patent is:—

In combination with a churn body, a dasher mechanism comprising a hollow shaft journaled for rotation, a hollow hub adapted to receive the end of the shaft, an imperforated plate closing the lower end of the hub and projecting laterally beyond the same, a perforated plate attached to the upper part of the hub and lying parallel with the first said plate, said hub being provided with laterally disposed perforations which are located between said plates at points below the plane occupied by the upper plate, said plates being of such diameter with relation to the churn body that sufficient space intervenes between the sides of the body and the edges of the plate to permit the contents of the body to describe substantially vertical orbits during the process of churning.

In testimony that I claim the foregoing as my own, I have hereto affixed my signature in the presence of two witnesses.

WILLIAM C. PEASE.

Witnesses:
J. H. HESTON,
DAVID H. THOMAS.